120,564

UNITED STATES PATENT OFFICE.

HAYDN M. BAKER, OF BROOKLYN, ASSIGNOR TO JOHN ADAMS, OF ROCHESTER, NEW YORK.

IMPROVEMENT IN CLEANING COTTON-WASTE AND OTHER FIBROUS MATERIALS.

Specification forming part of Letters Patent No. 120,564, dated November 7, 1871.

*To all whom it may concern:*

Be it known that I, HAYDN M. BAKER, of Brooklyn, E. D., in King's county and State of New York, have invented a new and useful Process for Cleansing Refuse Cotton-Waste and other substances saturated with oils and mixed with debris, and for recovering therefrom and refining the said oils; and I do hereby declare the following to be a full and exact description thereof.

Upon January 11, 1870, a patent was issued to me by the United States for cleansing cotton-waste and fibrinous substances by the use of silicate of soda. The process herein applied for embraces the same methods of manipulation, with a substitution of the cleansing agent. The agent employed in this case is a hot, boiling solution of aluminate of soda, or a hot, boiling, mixed solution of aluminate and silicate of soda.

To enable others to make use of the process by this description I will proceed to describe it.

One should first provide himself with a capacious boiling-tank, a centrifugal wringer, a French dash-wheel washing-machine, a drying-room, and a picker, besides having an engine and boiler of sufficient capacity to successfully operate the above-named machinery, together with the necessary connections therefor. It is also well to have a large reservoir of iron or wood, and a tank for boiling the recovered oils with a large quantity of water. Into this large boiling-tank place a solution of aluminate of soda, or a mixed solution of aluminate and silicate of soda of any density which persistent practice shall determine to be most desirable. Aluminate of potash, or a mixture of aluminate and silicate of potash, may be substituted for the aluminate of or mixture of silicate and aluminate of soda." Into this solution in the boiling-tank one may immerse the material to be cleansed, and should be guided in quantity by the strength of the said solution and the capacity of the said boiling-tank, being careful to employ no more waste or material than can be kept immersed below the surface of the solution contained therein. It is a good plan to boil the solution of the cleansing agent in which the waste is immersed by the injection of direct steam from near the bottom, secured by the employment of pipes so dispersed and arranged as to distribute the inlet for the said steam over the entire area of the said bottom. It is prudent to place a perforated false bottom over the pipes above mentioned to prevent the waste from coming in contact therewith. The boiling should now be commenced and continued for a period of twelve hours. The waste should then be placed in the centrifugal wringer while hot, and have all the adhering oils and other liquors ejected therefrom by the rapid rotation of the said wringer, the outlet of which connects with the reservoir or reposing-tank. After the waste has been wrung out the liquor remaining in the boiling-tank must also be run off or transferred to the reservoir or reposing-tank and allowed to repose for a term of twenty-four hours, after which time all the oils, fats, &c., will be found to have come to the surface of said liquors, from whence they may be skimmed off and transferred to the tank for boiling the oils, where they should be boiled with a large quantity of water a sufficient length of time to secure the removal therefrom of all foreign matters mechanically mixed therewith, after which they are ready for re-use as lubricators or for other purposes. The waste that has been wrung out should be transferred to a washing-machine (the French dash-wheel washing-machine) and there mulled and agitated with a large quantity of boiling water, the supply of water being constantly kept up and an overflow equal to the supply provided. When the water passes through the machine clear and uncolored it may be known that this stage of the operation is complete. This washed waste must then be transferred to the drying-room and there dried. When nearly or thoroughly dried it should be transferred to the picking-room and passed through the picker, after which it is ready for re-use as a packing for lubricating purposes or for any other industrial use for which it is applicable. The liquor remaining in the reposing-tank may be pumped back to the boiling-tank and used three or four times over by the addition thereto of a very small quantity of new material.

The foregoing embraces all that it is requisite to mention to enable one to successfully execute what is herein set forth. When the silicate of soda in solution is boiled with cotton-waste saturated with oils and immersed therein a portion of the soda saponifies the gums and gum resins contained in said oils, and this newly-formed soap combines with the remaining silicate of soda, and these two compounds and the water combine with and saturate the fiber of the waste, so that the pure oleine of the oils, being of less specific gravity than the other compounds, and having nothing with which to combine, rises to the surface of this newly-formed and complex compound solution in a free condition. The same relations, under the same circumstances, exist when aluminate of soda is used instead of silicate of soda, as above described. So also is the result the same when mixtures of aluminates and silicates in solution are used for the purposes hereinbefore named.

The advantages of this invention are that it affords an economical method of cleansing refuse cotton-waste and other fibrinous substances and of recovering the oils therefrom, and at the same time enhancing their value by removing all the adhesive properties and conferring perfectly unctuous and lubricating qualities to the said oils.

What I claim as my invention, and desire to secure by Letters Patent, is—

The process, as herein set forth, for the purpose of simultaneously cleansing refuse cotton-waste and other fibrinous substances, and recovering and refining the oils contained therein by the use of a hot, boiling solution of aluminate of soda or a hot, boiling solution of a mixture of aluminite and silicate of soda, substantially as described.

HAYDN M. BAKER.

Witnesses:
  E. A. THURSTON,
  C. A. PAYNTAR. (35)